United States Patent
Okamoto

(10) Patent No.: US 9,236,818 B2
(45) Date of Patent: Jan. 12, 2016

(54) DRIVE DEVICE AND DRIVE METHOD FOR BRUSHLESS MOTOR

(71) Applicant: HITACHI AUTOMOTIVE SYSTEMS, LTD., Hitachinaka-shi, Ibaraki (JP)

(72) Inventor: Naoki Okamoto, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 187 days.

(21) Appl. No.: 14/037,858

(22) Filed: Sep. 26, 2013

(65) Prior Publication Data
US 2014/0217936 A1    Aug. 7, 2014

(30) Foreign Application Priority Data

Feb. 6, 2013 (JP) ................................ 2013-021212

(51) Int. Cl.
| | |
|---|---|
| H03K 5/00 | (2006.01) |
| H02P 6/00 | (2006.01) |
| H02P 29/02 | (2006.01) |
| H02P 6/14 | (2006.01) |
| H02P 6/18 | (2006.01) |

(52) U.S. Cl.
CPC ............. *H02P 6/001* (2013.01); *H02P 6/142* (2013.01); *H02P 6/182* (2013.01); *H02P 29/021* (2013.01)

(58) Field of Classification Search
USPC .......... 318/400.13, 400.34, 400.35, 599, 563, 318/400.21, 400.22, 782
See application file for complete search history.

(56) References Cited

U.S. PATENT DOCUMENTS

| | | | |
|---|---|---|---|
| 8,258,732 B2 | 9/2012 | Iwaji et al. | |
| 2006/0186846 A1* | 8/2006 | Lassen ................... | H02P 6/182 318/400.21 |
| 2007/0194731 A1* | 8/2007 | Fukamizu ............... | H02P 6/182 318/400.09 |
| 2009/0079374 A1* | 3/2009 | De Four .................. | H02P 6/20 318/400.34 |
| 2009/0200971 A1 | 8/2009 | Iwaji et al. | |
| 2011/0234133 A1* | 9/2011 | Hano ...................... | H02P 6/182 318/400.21 |

FOREIGN PATENT DOCUMENTS

JP    2009-189176 A    8/2009

* cited by examiner

*Primary Examiner* — Shawki S Ismail
*Assistant Examiner* — Jorge L Carrasquillo
(74) *Attorney, Agent, or Firm* — Foley & Lardner LLP

(57) ABSTRACT

The invention relates to a drive device and a drive method for a brushless motor. In a drive method in which a switching timing of energization patterns is detected by comparing a pulse induced voltage of a non-energized phase with a voltage threshold, when the pulse induced voltage does not reach the voltage threshold, the pulse induced voltage at an angle of switching the energization patterns is measured. Discrimination between a demagnetization failure and a lock failure is performed based on whether the measured pulse induced voltage satisfies a predetermined condition or not. When it is the demagnetization failure, motor control continues after changing the voltage threshold. When it is the lock failure, the motor control stops.

16 Claims, 11 Drawing Sheets

FIG. 3

[ENERGIZATION PATTERN]

| ENERGIZED PHASE | U⇒V | U⇒W | V⇒W | V⇒U | W⇒U | W⇒V |
|---|---|---|---|---|---|---|
| OPEN PHASE | W | V | U | W | V | U |
| ENERGIZATION PATTERN | 1 | 2 | 3 | 4 | 5 | 6 |

[DEMAGNETIZATION FAILURE DETERMINATION CONDITION]

| <CONDITION 1> | LOW | HIGH | LOW | HIGH | LOW | HIGH |
|---|---|---|---|---|---|---|
| <CONDITION 2> | INDUCED VOLTAGES OF ENERGIZATION PATTERNS 1, 3, 5 FALL WITHIN PREDETERMINED RANGE ||||||
| | INDUCED VOLTAGES OF ENERGIZATION PATTERNS 2, 4, 6 FALL WITHIN PREDETERMINED RANGE ||||||

DRIVE DEVICE AND DRIVE METHOD FOR BRUSHLESS MOTOR

BACKGROUND OF THE INVENTION

1. Field of the Invention

The present invention relates to a drive device and a drive method, which switches two phases according to a pulse induced voltage induced in a non-energized phase, the two phases being selected from three phases of a brushless motor and to be applied with a pulse voltage according to a pulse width modulation signal.

2. Description of Related Art

Japanese Laid-open (Kokai) Patent Application Publication No. 2009-189176 discloses a drive device for a three-phase brushless motor that measures a pulse induced voltage induced in a non-energized phase by a pulse voltage, and compares this pulse induced voltage with a threshold, to successively switch energization patterns.

However, in a sensor-less control which compares a pulse induced voltage of a non-energized phase with a threshold and thereby successively switches two phases to be applied with the pulse induced voltage, when the pulse induced voltage is decreased and does not reach the threshold due to a demagnetization failure, energization patterns cannot be switched, so that the brushless motor cannot be started up.

Although it becomes possible to start up the brushless motor by changing the threshold according to the decrease in the pulse induced voltage, the start-up failure of the brushless motor also occurs when the brushless motor is locked.

However, it has been difficult to discriminate between the demagnetization failure allowing the motor startup and the lock not allowing such startup, and therefore there has been a possibility that the control of the brushless motor might be continued in the locked state, in which the startup is not allowed.

SUMMARY OF THE INVENTION

Accordingly, an object of the present invention is to provide a drive device and a drive method for a brushless motor that allow appropriate selection between continuation of control and stop thereof when an abnormality occurs in the control of the brushless motor.

To achieve the above object, a drive device for a brushless motor according to an aspect of the invention includes: a control unit that switches two phases according to a pulse induced voltage induced in a non-energized phase, the two phases being selected from three phases of the brushless motor and to be applied with a pulse voltage according to a pulse width modulation signal; a detecting unit that detects whether an abnormality occurs or not in control executed by the control unit; and a selecting unit that selects between continuation and stop of the control executed by the control unit according to the pulse induced voltage at an angle of switching the two phases to be applied with the pulse voltage, when the abnormality occurs in the control executed by the control unit.

Furthermore, a drive method for a brushless motor according to an aspect of the invention includes the steps of: switching two phases according to a pulse induced voltage induced in a non-energized phase, the two phases being selected from three phases of the brushless motor and to be applied with a pulse voltage according to a pulse width modulation signal; detecting whether an abnormality occurs or not in switching control of the two phases to be applied with the pulse voltage; measuring the pulse induced voltage at an angle of switching the two phases to be applied with the pulse voltage, when the abnormality occurs in the switching control; and selecting between continuation and stop of the control of the brushless motor according to the measured pulse induced voltage.

Other objects and features of aspects of the present invention will be understood from the following description with reference to the accompanying drawings.

BRIEF DESCRIPTION OF THE DRAWINGS

FIG. 3 is a diagram illustrating an energization pattern of the brushless motor and detection conditions of a demagnetization failure in an embodiment of the invention;

DESCRIPTION OF THE PREFERRED EMBODIMENTS

Figure 1:
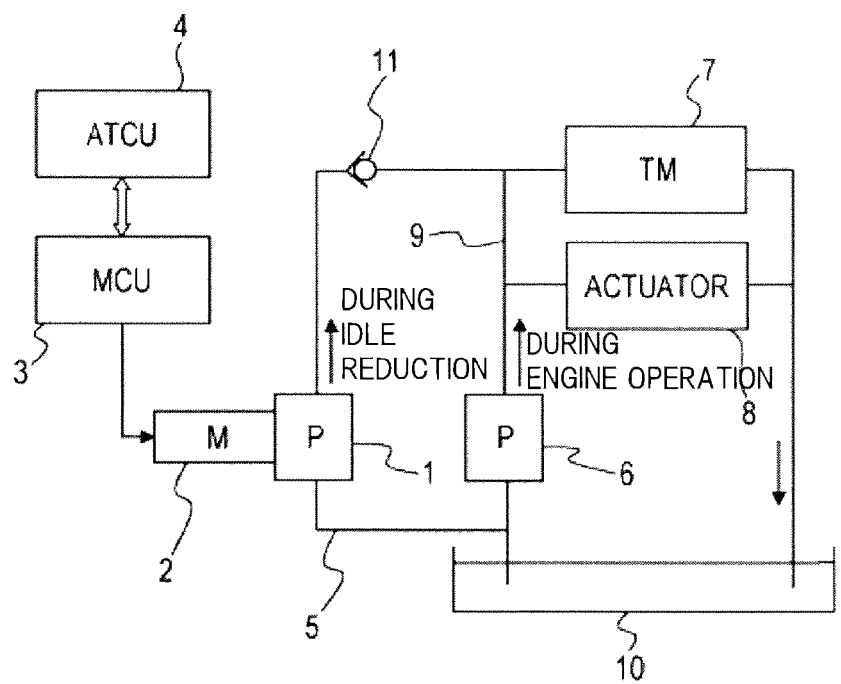
FIG. 1 is a block diagram illustrating a hydraulic pump system in an embodiment of the invention.

FIG. 1 is a block diagram illustrating a hydraulic pump system, which is an example in which a drive device for a brushless motor according to an embodiment of the invention is applied thereto. This hydraulic pump system is a system for circulating oil in a vehicle automatic transmission.

The hydraulic pump system illustrated in FIG. 1 includes a mechanical oil pump 6 driven by an output of an engine (not shown) and a motor-driven electric oil pump 1, serving as oil pumps for supplying the oil to a transmission 7 and an actuator 8.

Electric oil pump 1 operates, for example, when the engine is stopped due to an idle reduction, and thereby supplies the oil to transmission 7 and actuator 8 to suppress a decrease in an oil pressure during the idle reduction.

Electric oil pump 1 is driven by a three-phase brushless motor 2 directly coupled thereto, and brushless motor 2 is controlled by a motor control device 3 based on a command provided from an AT control device 4. Motor control device 3 is a drive device that controls energization of each phase of brushless motor 2.

Electric oil pump 1 driven by brushless motor 2 supplies the oil in an oil pan 10 to transmission 7 and actuator 8 through an oil piping 5.

During operation of the engine, mechanical oil pump 6 driven by the engine is operated to supply the oil from mechanical oil pump 6 to transmission 7 and actuator 8. At that time, brushless motor 2 is in the stopped state, a check valve 11 cuts off the flow of the oil toward electric oil pump 1.

On the other hand, when the engine is stopped by the idle reduction, mechanical oil pump 6 is stopped, so that the oil pressure is decreased in an oil piping 9, and thus, AT control device 4 sends a motor startup command to motor control device 3 in response to a stop command of the engine due to the idle reduction.

Upon reception of the motor startup command, motor control device 3 starts up brushless motor 2 to rotate electric oil pump 1, and thereby starts oil supply under pressure by electric oil pump 1.

Then, when a discharge pressure of electric oil pump 1 exceeds a set pressure while a discharge pressure of mechanical oil pump 6 decreases, check valve 11 opens, so that oil circulates through a route of oil piping 5, electric oil pump 1, check valve 11, transmission 7, actuator 8 and oil pan 10.

The brushless motor, which is driven by the drive device according to the invention, may be, for example, a brushless motor which drives an electric water pump used for circulating cooling water for an engine in a hybrid vehicle and others, and the equipment driven by the brushless motor is not limited to the oil pump. The brushless motor is not limited to the motor mounted on the vehicle.

Figure 2:
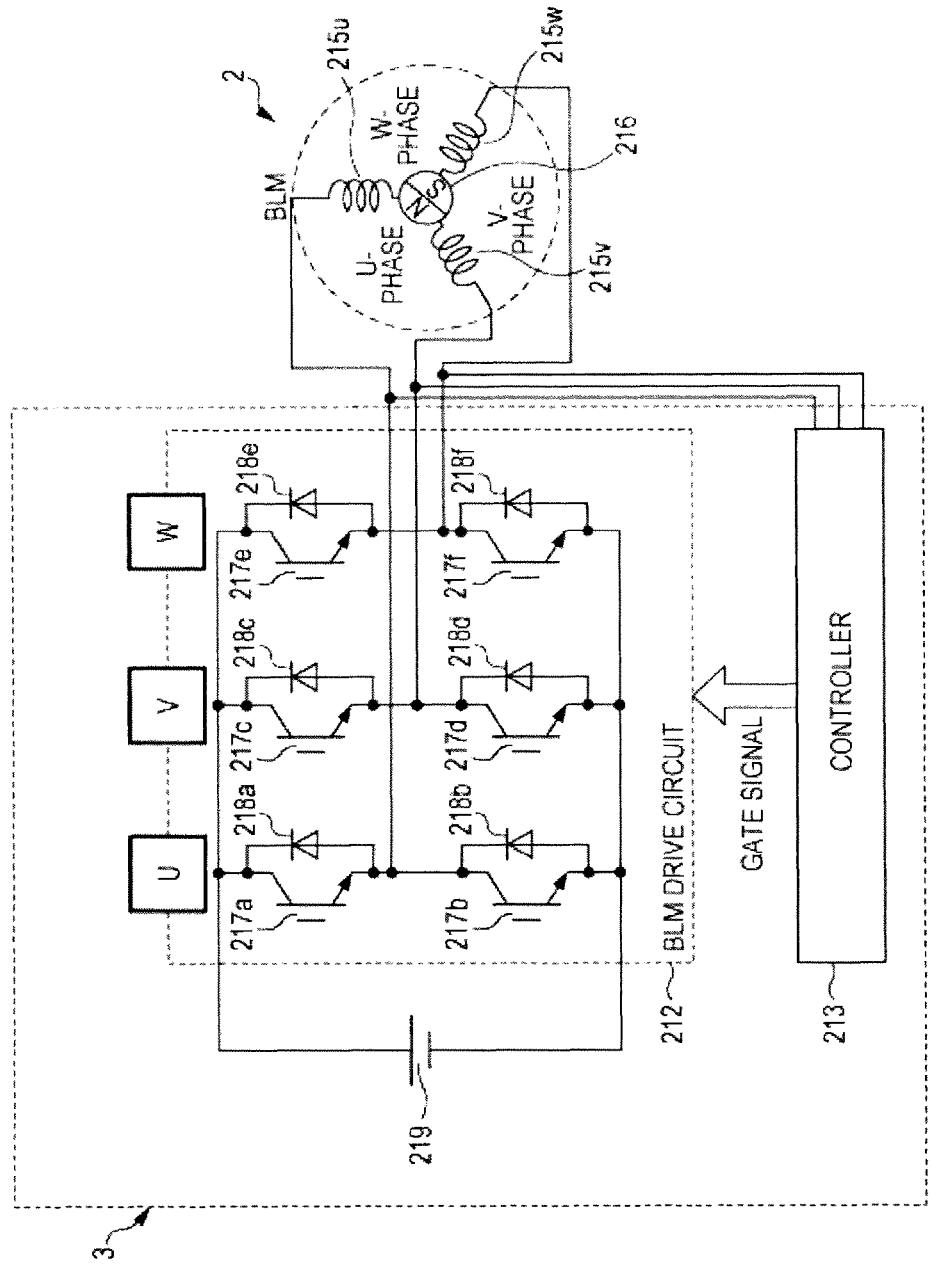
FIG. 2 is a circuit diagram illustrating a brushless motor and a control device in an embodiment of the invention.

FIG. 2 is a circuit diagram illustrating, by way of example, brushless motor 2 and control device 3.

Control device 3 includes a drive circuit 212 and a controller 213 provided with a microcomputer. Controller 213 performs communications with AT control device 4 through a communication line (not shown).

Brushless motor 2 is a three-phase DC brushless motor, which includes three-phase coils 215u, 215v and 215w of U-, V- and W-phases on a cylindrical stator (not shown) and includes a permanent magnet rotator 216 that is rotatable in a space formed in a central of the stator.

Drive circuit 212 has a circuit including a three-phase bridge-connected switching elements 217a-217f including antiparallel diodes 218a-218f, respectively, and also has a power supply circuit 219, and switching elements 217a-217f are formed of, e.g., FETs, respectively.

Switching elements 217a-217f have gate terminals connected to controller 213, and controller 213 controls the ON and OFF of switching elements 217a-217f by pulse width modulation PWM.

Controller 213 performs the drive control of brushless motor 2 in a sensor-less manner, in which a sensor obtaining position information about the rotator is not used, and further performs switching between sine wave drive and rectangular wave drive according to a motor rotation speed.

The sine wave drive is a manner of driving brushless motor 2 by adding a sine wave voltage to each phase. In this sine wave drive, the position information of the rotator is derived from the induced voltage (speed electromotive voltage) generated by the rotation of the rotator. Also, during a detection period of the rotator position according to the speed electromotive voltage, the rotator position is estimated based on the motor rotation speed. A three-phase output value is calculated from the estimated rotator position and a PWM duty, so that the direction and the intensity of electric current is controlled according to a phase-to-phase difference in voltage, to thereby allow a three-phase alternating current to flow.

The rectangular wave drive is a manner of driving brushless motor 2 by successively switching, according to a predetermined switching timing, energization patterns in which the two phases to be applied with the pulse voltage are selected from the three phases of brushless motor 2. In this rectangular wave drive, controller 213 obtains the position information of the rotator from the pulse induced voltage that is the voltage induced in the non-energized phase by the application of the pulse-like voltages to the energized phases, and thereby detects the timing in switching of the two phases to be applied with the pulse voltage selected from the three phases of brushless motor 2. Thus, it detects the switching timing of the energization patterns.

In the above, an output level of the speed electromotive voltage measured for the position detection in the sine wave drive decreases as the motor rotation speed decreases, and therefore the accuracy of the position detection based on the speed electromotive voltage is decreased in the region of a low rotation speed. However, the pulse induced voltage to be measured for the position detection in the rectangular wave drive keeps a sufficient output level and allows detection of the position information based on the pulse induced voltage even in the region of the low rotation speed including the motor-stopped state.

Accordingly, controller 213 drives brushless motor 2 by the sine wave drive in the region of a high rotation speed in which the sine wave drive allows detection of the position information with a sufficient accuracy, and drives brushless motor 2 by the rectangular wave drive in the region of the low rotation speed in which the sine wave drive does not allow detection of the position information with a sufficient accuracy.

In the rectangular wave drive, a voltage threshold for deciding the timing of switching to a next energization pattern is set for each energization pattern. Controller 213 detects, as the switching timing of the energization patterns, a timing at which the pulse induced voltage induced in the non-energized phase exceeds the voltage threshold, and switches the energization to the next energization pattern when it detects the switching timing.

The pulse induced voltage induced in the non-energized phase changes according to an angle of brushless motor 2. Therefore, controller 213 sets, in advance, a pulse induced voltage at a switching angle of the energization patterns as the voltage threshold, and detects that the angle of brushless motor 2 is the switching angle of the energization pattern when the pulse induced voltage reaches the voltage threshold.

As illustrated in FIG. 3, six energization patterns (1)-(6) are set as the energization patterns.

In the energization pattern (1), the current flows from the U-phase to the V-phase. In the energization pattern (2), the current flows from the U-phase to the W-phase. In the energization pattern (3), the current flows from the V-phase to the W-phase. In the energization pattern (4), the current flows from the V-phase to the U-phase. In the energization pattern (5), the current flows from the W-phase to the U-phase. In the energization pattern (6), the current flows from the W-phase to the V-phase. Controller 213 successively switches the energization patterns every electric angle of 60 degrees.

Accordingly, the W-phase becomes the non-energized phase in the energization pattern (1), the V-phase becomes the non-energized phase in the energization pattern (2), the U-phase becomes the non-energized phase in the energization pattern (3), the W-phase becomes the non-energized phase in the energization pattern (4), the V-phase becomes the non-energized phase in the energization pattern (5) and the U-phase becomes the non-energized phase in the energization pattern (6).

In a case in which the angular position of the U-phase coil is the position of the rotator at the angle of 0 degrees, for example, the angular position of the rotator at which the switching from the energization pattern (3) to the energization pattern (4) is performed is set to 30 degrees, the angular position of the rotator at which the switching from the energization pattern (4) to the energization pattern (5) is performed is set to 90 degrees, the angular position of the rotator at which the switching from the energization pattern (5) to the energization pattern (6) is performed is set to 150 degrees, the angular position of the rotator at which the switching from the energization pattern (6) to the energization pattern (1) is performed is set to 210 degrees, the angular position of the rotator at which the switching from the energization pattern (1) to the energization pattern (2) is performed is set to 270 degrees, and the angular position of the rotator at which the switching from the energization pattern (2) to the energization pattern (3) is performed is set to 330 degrees.

Controller 213 detects the switching timing of the energization patterns switching every 60 degrees described above based on a comparison between the pulse induced voltage in the non-energized phase and the voltage threshold.

Figure 4:
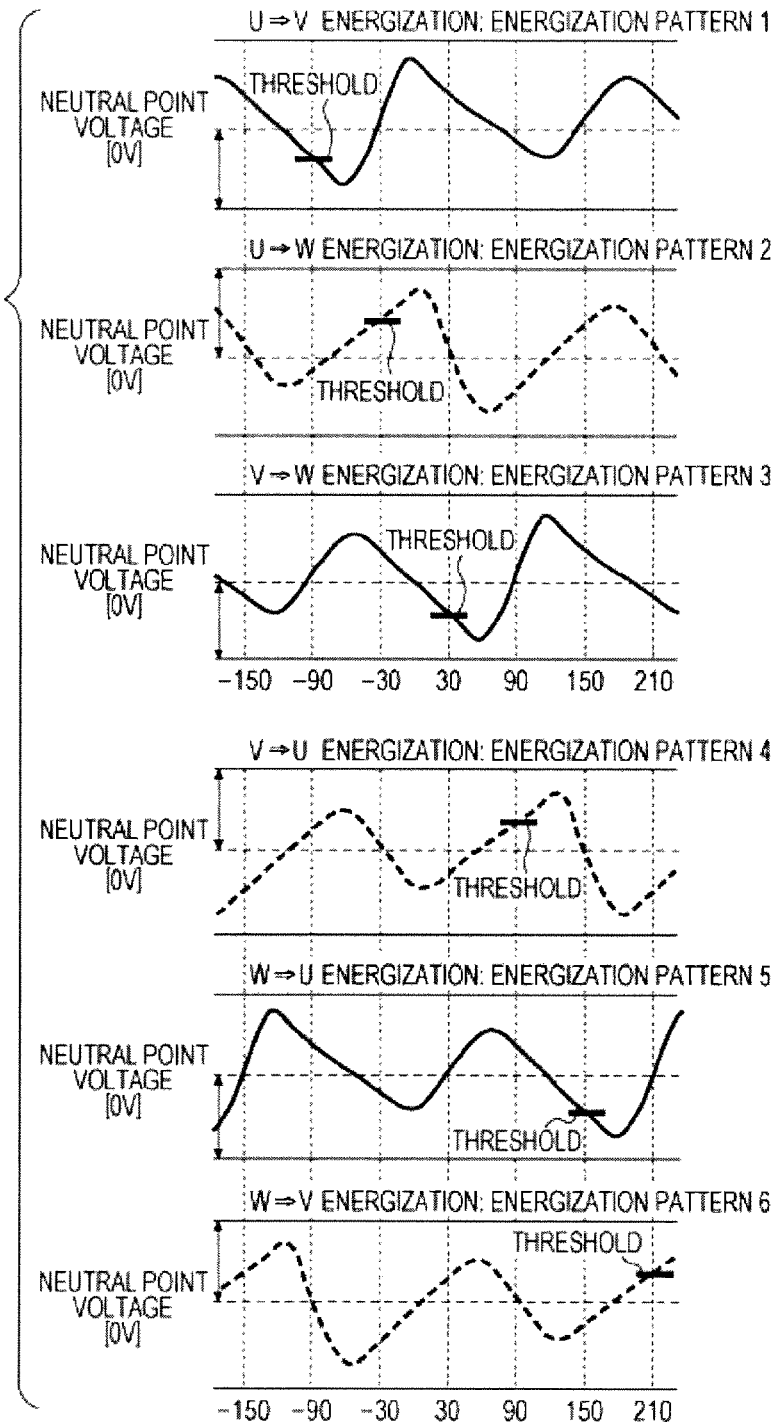
FIG. 4 is a diagram illustrating a voltage of a non-energized phase of the brushless motor in an embodiment of the invention.

The voltage threshold is set to a value higher or lower than a neutral point voltage as illustrated in FIG. 4.

In the energization patterns (1), (3) and (5), the voltage threshold is set to a value lower than the neutral point voltage. Controller 213 performs the switching to the next energization pattern when the voltage of the non-energized phase becomes lower than the voltage threshold lower than the neutral point voltage. In the energization patterns (2), (4) and (6), the voltage threshold is set to a value higher than the neutral point voltage. Controller 213 performs the switching to the next energization pattern when the voltage of the non-energized phase becomes higher than the voltage threshold higher than the neutral point voltage.

In this way, in the rectangular wave drive, controller 213 switches the energization patterns based on the comparison of the pulse induced voltage of the non-energized phase with the voltage threshold. Therefore, when the demagnetization failure which decreases a magnetic flux occurs under high-temperature conditions or the like, and the pulse induced voltage of the non-energized phase decreases and does not reach the voltage threshold, e.g., as illustrated in FIG. 5, controller 213 cannot detect the switching timing of the energization patterns, and cannot startup brushless motor 2.

Figure 5:
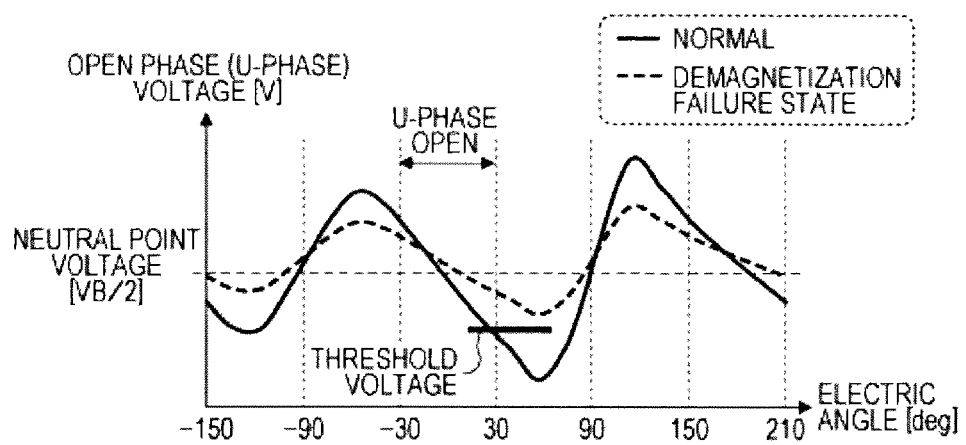
FIG. 5 is a diagram illustrating changes in pulse induced voltage due to a demagnetization failure of the brushless motor in an embodiment of the invention.

During an open period of the U-phase illustrated in FIG. 5, the energization is performed according to the energization pattern (3). In the energization control state according to this energization pattern (3), when controller 213 measures that the pulse induced voltage induced in the non-energized phase, i.e., the U-phase, becomes lower than the voltage threshold that is set as the voltage lower than the neutral point voltage, controller 213 performs the switching to the energization pattern (4).

However, when amplitude of the pulse induced voltage becomes small due to occurrence of a demagnetization failure and the pulse induced voltage no longer changes across the voltage threshold, controller 213 can no longer detect the timing of switching to the energization pattern (4) and therefore maintains the energization pattern (3) so that brushless motor 2 cannot be started up.

Figure 6:
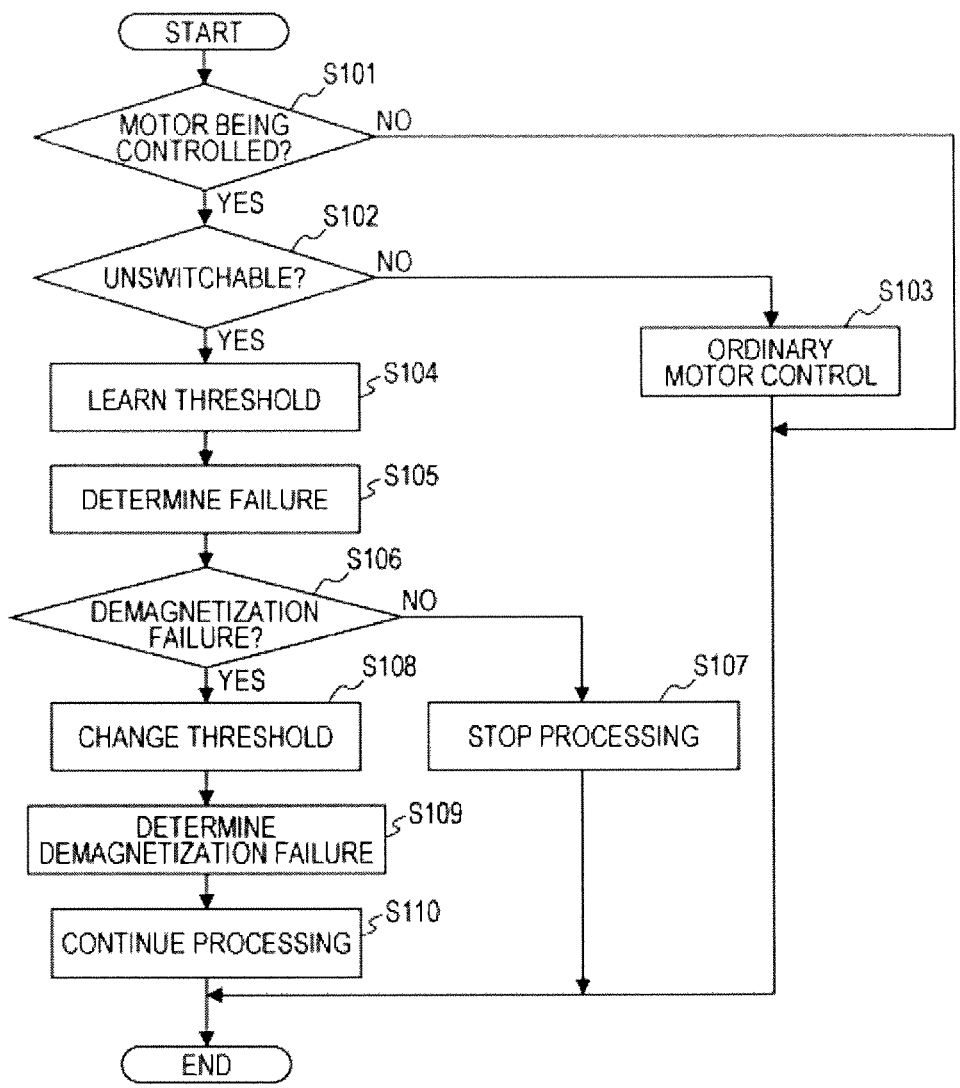
FIG. 6 is a flowchart illustrating processing in a case in which the demagnetization failure occurs in the brushless motor in an embodiment of the invention.

Thus, controller 213 controls brushless motor 2 as illustrated in a flowchart of FIG. 6.

In the flowchart of FIG. 6, controller 213 determines in step S101 whether the energization of the respective phases of brushless motor 2 is being performed by the rectangular wave drive for generating a motor toque, or not.

When controller 213 determines in step S101 that brushless motor 2 is being controlled, the operation proceeds to step S102, and controller 213 determines whether a duration time of a state in which the pulse induced voltage of the non-energized phase has not reached the voltage threshold set for each energization pattern is equal to or greater than the set time or not.

In other words, controller 213 determines whether such an abnormal state, in which the energization pattern has continued for a time which cannot be attained in the normal state, has occurred or not.

When the switching of the energization patterns is in a state in which the switching is successively performed at time periods which is within the normal range, i.e., when the energization control by the rectangular wave drive is normal, the operation of controller 213 proceeds to step S103.

When the switching to the sine wave drive is already performed, controller 213 determines in step S102 that the normal startup is already performed, and the operation proceeds to step S103.

In step S103, controller 213 drives brushless motor 2 by the rectangular wave drive or the sine wave drive.

When controller 213 determines that the duration time of the state in which the pulse induced voltage of the non-energized phase has not reached the voltage threshold set for each energization pattern is equal to or greater than the set time, i.e., when the operation is in the abnormal state in which the energization pattern cannot be switched and therefore brushless motor 2 cannot be started up correctly, the operation proceeds to step S104.

In step S104, controller 213 drives brushless motor 2 to the angular position where the energization patterns are switched, and measures the pulse induced voltage of the non-energized phase at the angular position where the energization pattern is switched, and then performs, for each energization pattern, the processing of learning the voltage threshold for updating the voltage threshold used for detection of the switching timing of the energization patterns based on the measured pulse induced voltages.

As described before, the six patterns (1)-(6) are set as the energization patterns, respectively. In step S104, therefore, controller 213 learns six voltage thresholds used for the six energization patterns, respectively.

The learning processing for the voltage thresholds by controller 213 will be described later in detail according to the flowchart.

In the next step S105, controller 213 executes the processing of determining whether the abnormal state is caused by the demagnetization failure or a failure other than the demagnetization failure.

The demagnetization failure is a state in which a magnetic flux of the brushless motor has decreased due to heat or the like, and the failure other than the demagnetization failure is, e.g., an immovable state caused by the lock of the rotator or the output shaft of brushless motor 2 or the like. As will be described later, controller 213 selects between continuation and stop of the control of brushless motor 2, depending on whether the failure is the demagnetization failure or a failure other than the demagnetization failure.

In a case in which the demagnetization failure has occurred, when controller 213 changes the voltage threshold used for detecting the switching timing of the energization patterns to a value corresponding to the decreased pulse induced voltage, the energization patterns can be switched based on the comparison between the voltage threshold and the pulse induced voltage, and thereby brushless motor 2 can be started up. However, in a case in which the failure other than the demagnetization failure has occurred, the energization patterns cannot be switched correctly even when the voltage threshold is changed, and therefore controller 213 stops the control of brushless motor 2.

Figure 7:
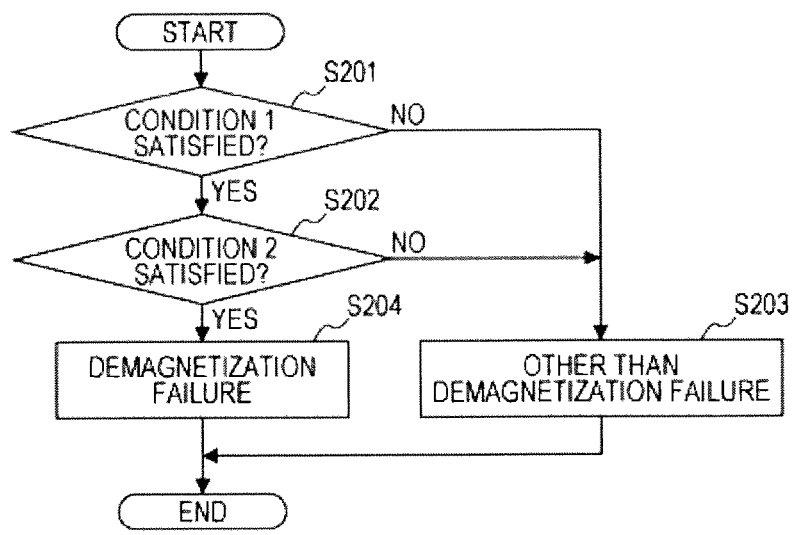
FIG. 7 is a flowchart illustrating detection processing of a failure of the brushless motor in an embodiment of the invention.

As illustrated in a flowchart of FIG. 7, controller 213 performs the determination of step S105 as to whether the failure is the demagnetization failure or not.

In the flowchart of FIG. 7, in step S201, controller 213 determines whether the voltage threshold learned in step S104 satisfies a condition (0) or not.

Figure 8:
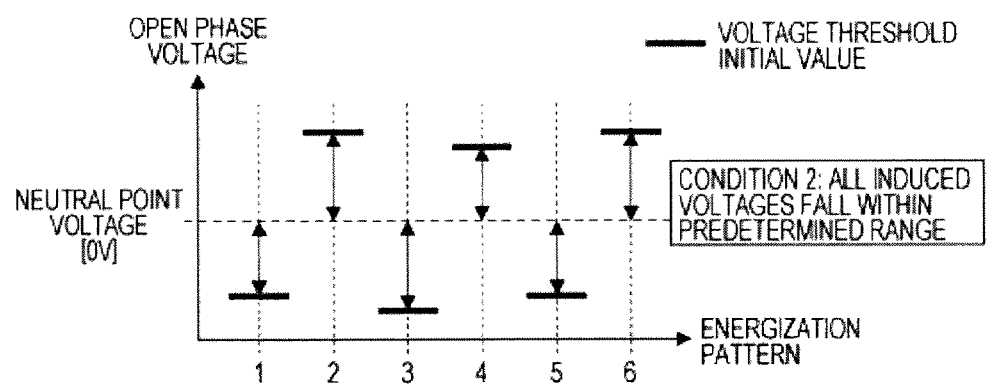
FIG. 8 is a diagram illustrating the detection conditions of the demagnetization failure of the brushless motor in an embodiment of the invention.

According to the control of brushless motor 2 by controller 213, as illustrated in FIGS. 4 and 8, the voltage thresholds in the energization patterns (1), (3) and (5) are set to a value lower than the neutral point voltage, and the voltage thresholds in the energization patterns (2), (4) and (6) are set to a value higher than the neutral point voltage.

Even when the demagnetization failure occurs, the pulse induced voltage at the switching timing of the energization patterns holds the state lower than the neutral point voltage in the energization patterns (1), (3) and (5), and holds the state higher than the neutral point voltage in the energization patterns (2), (4) and (6).

On the other hand, when brushless motor 2 is locked to enter the immovable state, such characteristics that the pulse induced voltage at the switching timing of the energization patterns is lower than the neutral point voltage in the energization patters (1), (3) and (5), and is higher than the neutral point voltage in the energization patterns (2), (4) and (6), are no longer held.

For example, when it is assumed that brushless motor 2 is locked at the position of 30 degrees, and when it is in the energization pattern (3), the pulse induced voltage of the non-energized phase, that is, the U-phase, exhibits a value corresponding to the position of 30 degrees, that is, the angular position for switching to the energization pattern (4). However, according to the energization pattern (1), the pulse induced voltage of the non-energized phase, that is, the W-phase, holds the voltage higher than that at the neutral point, and does not satisfy the conditions that the pulse induced voltage at the timing of switching to the energization pattern (2) in the energization pattern (1) is lower than the neutral point voltage.

Regardless of the angular position in which brushless motor 2 is locked, such an energization pattern that a state in which the pulse induced voltage at the switching timing is lower or higher than the neutral point voltage is reversed from the normal state, occurs.

Accordingly, when the relationship between the newly learned voltage threshold and the neutral point voltage keeps the normal state, that is, when the voltage thresholds in the energization patterns (1), (3) and (5) are lower than the neutral point voltage, and the voltage thresholds in the energization patterns (2), (4) and (6) are higher than the neutral point voltage, controller 213 determines that the demagnetization failure lowers the pulse induced voltage and consequently the detection of the switching timing of the energization patterns becomes impossible.

Thus, the state satisfying the condition (1) is a state in which all the six newly learned voltage thresholds keep the states higher or lower than the neutral point voltage without changing from the initial state, as illustrated in FIG. 3.

When at least one of the newly learned voltage thresholds exhibits the high/low relationship different from that in the normal state with respect to the neutral point voltage, the characteristics are different from those in a case in which the pulse induced voltage decreases due to the demagnetization failure. Therefore, when the condition (1) is not satisfied, controller 213 determines that brushless motor 2 cannot be started up due to a failure such as a lock failure other than the demagnetization failure, and the operation proceeds to step S203, in which controller 213 determines the occurrence of the failure other than the demagnetization failure.

The state in which the voltage threshold is higher or lower than the neutral point voltage is a state in which the voltage threshold falls within a voltage range higher than the neutral point voltage, or does not fall within a voltage range lower than the neutral point voltage.

Controller 213 may determine whether the condition (1) is satisfied or not, based on the pulse induced voltage measured at the angle of switching the energization patterns, instead of the voltage threshold.

In a case in which the voltage of the non-energized phase is measured with reference to the neutral point voltage, controller 213 may perform the determination whether the condition (1) is satisfied or not, based on whether the measured pulse induced voltage or the voltage threshold set based on the measured pulse induced voltage is positive or negative in value.

When controller 213 determines in step S201 that all the six voltage thresholds have held the states higher or lower than the neutral point voltage without changing from the initial states, controller 213 can determine that the demagnetization failure has occurred. However, the operation of controller 213 further proceeds to step S202, and controller 213 determines whether the voltage threshold learned in step S104 satisfies the condition (2) or not.

The condition (2) is a condition in which it is determined whether the pulse induced voltage has actually lowered or not, while satisfying the condition (1). As illustrated in FIG. 8, the condition (2) requires that all the voltage thresholds learned in step S104 fall within the voltage range defined between the initial value of the voltage threshold and the neutral point voltage.

When the demagnetization failure occurs, the pulse induced voltage decreases. Therefore, even if the six voltage thresholds satisfy the condition (1), there is a possibility that the failure other than the demagnetization failure has occurred when the newly learned voltage threshold is greater than the initial values in the energization pattern (2), (4) or (6), and when it is less than the initial value in the energization pattern (1), (3) or (5).

Conversely, when all the voltage thresholds learned in step S104 fall within the voltage range defined between the initial value of the voltage threshold and the neutral point voltage and the condition (2) is satisfied, it is confirmed that the demagnetization failure has occurred.

When the condition (2) is not satisfied, the failure other than the demagnetization failure may have occurred even if the condition (1) is satisfied. Therefore, the operation of controller 213 proceeds to step S203, in which controller 213 determines that the failure other than the demagnetization failure has occurred.

Conversely, when the conditions (1) and (2) are satisfied, the operation of controller 213 proceeds to step S204, in which controller 213 determines that the demagnetization failure has occurred.

Step S202 may be omitted, and controller 213 may determine whether the failure occurring in the present state is the demagnetization failure or the failure other than the demagnetization failure, based on the determination whether the condition (1) is satisfied or not in step S201. Conversely, step S201 may be omitted, and controller 213 may determine whether the failure occurring in the present state is the demagnetization failure or the failure other than the demagnetization failure, based on the determination whether the condition (2) is satisfied or not in step S202.

The voltage threshold to be compared with the newly learned voltage threshold is not limited to the initial value, and controller 213 may compare the newly learned voltage threshold with, for example, the previous learned value, a moving average value of the learned values or the like.

The determination as to whether the failure is the demagnetization failure or not based on the learned voltage threshold is not limited to the determination based on the conditions (1) and (2). Controller 213 may determine whether the failure is the demagnetization failure or not, based on a comparison between the voltage threshold learned in a state where the normal energization control cannot be performed and the voltage range set as the normal range or the abnormal range.

After controller 213 performs, in step S105 of the flowchart in FIG. 6, the determination whether the demagnetization failure has occurred or the failure other than the demagnetization failure has occurred, controller 213 determines in step S106 whether the occurrence of the demagnetization failure was determined in the process of step S105 or not.

When the failure other than the demagnetization failure has occurred, the switching control of the energization patterns cannot be performed correctly even when the newly learned voltage threshold is used. Accordingly, the operation of controller 213 proceeds to step S107, in which controller 213 stops the energization of brushless motor 2 to keep brushless motor 2 in the stopped state, and notifies AT control device 4 and others, of the fact that the driving of brushless motor 2 has been stopped due to occurrence of the lock failure or the like other than the demagnetization failure in brushless motor 2.

When AT control device 4 receives the signal indicative of the occurrence of the lock failure or the like other than the demagnetization failure in brushless motor 2, AT control device 4 performs processing, such as outputting a signal requesting prohibition of the idle reduction, outputting a control signal operating a warning device to issue a warning about the failure occurrence in brushless motor 2, storing a determination history of the lock failure, and the like.

Conversely, when controller 213 determines in step S106 that the demagnetization failure has occurred, the operation proceeds to step S108, in which controller 213 performs processing to use the newly learned voltage threshold as the voltage threshold used for controlling the switching of the energization patterns. Thus, controller 213 performs the processing of changing the voltage threshold to the value which is exceeded by the pulse induced voltage decreased due to the demagnetization failure, when the angle of switching the energization pattern is attained. As a result of the above change of the voltage threshold, the voltage threshold approaches the neutral point voltage.

By changing the voltage threshold, it becomes possible to detect the angular position in which the energization patterns are to be switched according to the comparison between the pulse induced voltage and the voltage threshold, even after the pulse induced voltage is decreased due to the demagnetization failure.

When controller 213 performs the processing of changing the voltage threshold in step S108, controller 213 sets, in the next step S109, a flag indicating that the occurrence of the demagnetization failure is detected.

In the next step S110, controller 213 continues the control of brushless motor 2, using the voltage threshold changed in step S108, and further notifies AT control device 4 and others of the fact that the demagnetization failure has occurred.

When AT control device 4 receives the signal indicative of the occurrence of the demagnetization failure in brushless motor 2, AT control device 4 performs processing, such as outputting a signal requesting the change in execution conditions of the idle reduction, outputting the control signal that operates the warning device to issue a warning about the failure occurrence in brushless motor 2, and storing a determination history of the demagnetization failure.

According to the control of brushless motor 2 executed by controller 213 illustrated in the flowchart of FIG. 6, the causes of the abnormality are divided into the demagnetization failure and others in the abnormal state in which the switching control of the energization patterns cannot be performed based on the pulse induced voltage. When the cause is the demagnetization failure, controller 213 changes the voltage threshold and continues the control. When the cause is the failure other than the demagnetization failure, controller 213 stops the control of brushless motor 2.

Accordingly, in a state in which the demagnetization failure has occurred but brushless motor 2 can be driven, it is possible to suppress the unnecessary prohibition of the drive, and thereby the normal operation of the system including brushless motor 2 can be continued.

When the lock failure occurs, execution of the control of brushless motor 2 is suppressed, and protection of the motor drive circuit and others can be achieved. Also, it is possible to suppress erroneous execution of the operation predicated on the driving of brushless motor 2.

Hereunder, the learning of the voltage threshold in step S104 of the flowchart of FIG. 6 will be described in detail.

Figure 9:
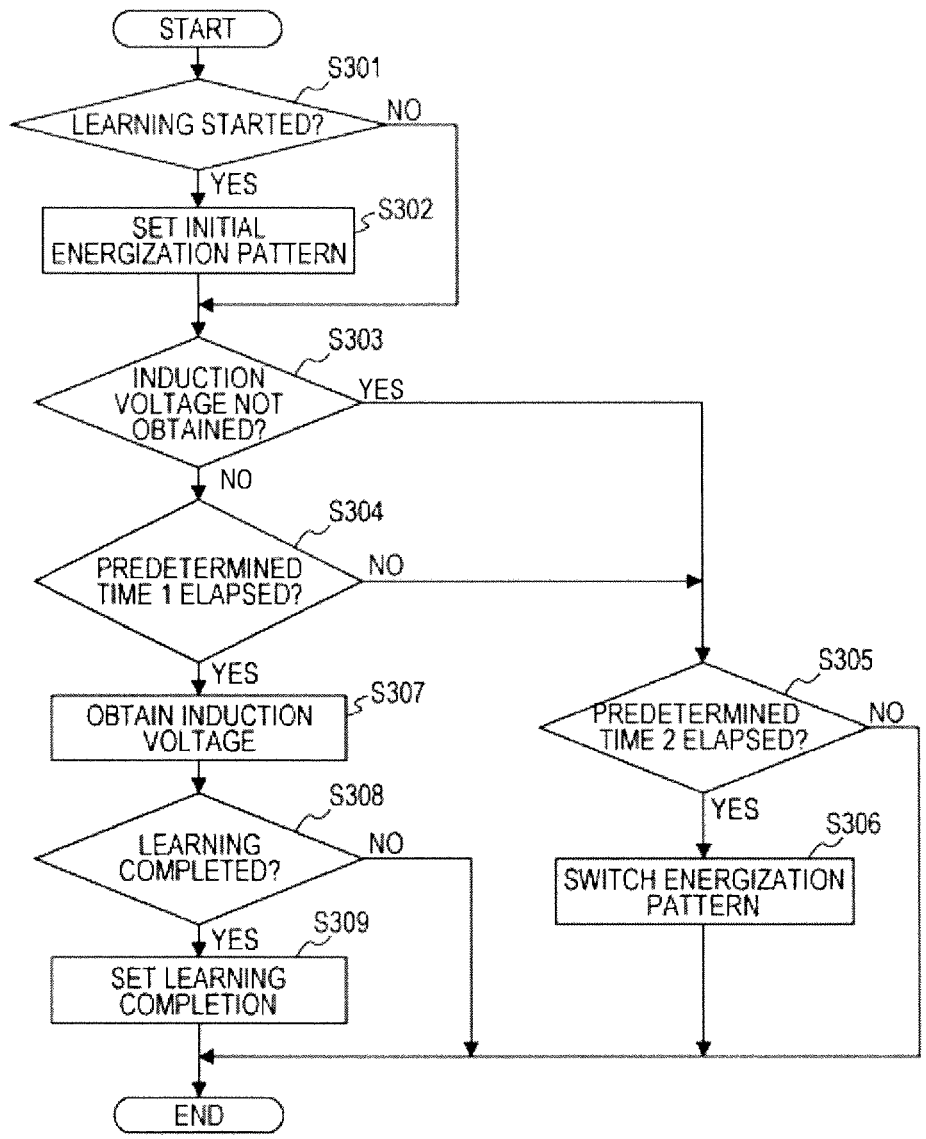
FIG. 9 is a flowchart illustrating processing of measuring the pulse induced voltage at an angle of switching energized phases in an embodiment of the invention.

FIG. 9 illustrates an example of the learning processing of the voltage threshold executed by controller 213.

In step S301, controller 213 determines whether or not the learning of the voltage threshold is to be started because the energization patterns of brushless motor 2 cannot be switched.

When controller 213 determines the start of the learning in step S301, the operation proceeds to step S302, in which controller 213 sets an initial energization pattern and energizes each phase of brushless motor 2 according to the set energization pattern.

As the initial energization pattern, controller 213 may set the energization pattern that was set when the abnormality of the control was determined, may set a energization pattern that is advanced by a predetermined number of times from the energization pattern that was set when the abnormality in the control was determined, and further may set a predetermined energization pattern.

Conversely, when the learning is not to be started, the operation of controller 213 bypasses step S302 and proceeds to step S303.

Controller 213 determines, in step S303, whether the pulse induced voltage of the non-energized phase in the energization pattern at that time is already obtained or not. When the pulse induced voltage is not yet obtained, the operation proceeds to step S304. When the pulse induced voltage is already obtained, the operation of controller 213 proceeds to step S305.

In step S304, controller 213 determines whether a predetermined time (1) or more has elapsed since the switching of the energization patterns, or not. When the predetermined time (1) or more has elapsed since the switching of the energization patterns, the operation of controller 213 proceeds to step S307. When the predetermined time (1) has not elapsed, the operation proceeds to step S305.

The predetermined time (1) is a delay time from the switching of the energization patterns to the measurement of the pulse induced voltage at the angle at which the energization patterns are switched. The predetermined time (1) is set to avoid a fluctuation period of the voltage of the non-energized phase immediately after the switching of the energization patterns.

In a case of the initial energization pattern, the operation of controller 213 proceeds to step S305 regardless of elapsing and non-elapsing of the predetermined time (1).

In step S305, it is determined whether the time elapsed since setting of the energization pattern at that time has reached a predetermined time (2) or not.

When the time elapsed since setting of the energization pattern at that time has not reached the predetermined time (2), the routine is terminated, so that the energization with the energization pattern at that time continues.

The predetermined time (2) is a response time required before the actual motor angle becomes stable after reaching the angle corresponding to the energization pattern at that time. The predetermined time (2) is set such that when the predetermined time (2) has elapsed after the switching of the energization patterns, it can be regarded that brushless motor 2 has rotated to and stopped at the angle corresponding to the energization pattern at that time.

The predetermined time (1) is shorter than the predetermined time (2).

When the energization pattern at that time has not continued for the predetermined time (2), controller 213 terminates the routine, so that the energization with the energization pattern at that time further continues. When the energization pattern at that time has continued for the predetermined time (2), the operation of controller 213 proceeds to step S306, in which controller 213 performs the switching to the next energization pattern.

When controller 213 switches the energization patterns, the operation proceeds from step S304 to step S307 after elapsing of the predetermined time (1).

In step S307, controller 213 samples the voltage of the non-energized phase of the energization pattern at that time, as the pulse induced voltage at the angle at which the energization patterns are switched.

For example, by continuing the energization in the energization pattern (3), brushless motor 2 can be positioned in the position of 90 degrees that is the angle of switching from the energization pattern (4) to the energization pattern (5). By the switching from the energization pattern (3) to the energization pattern (4) in the above state, a voltage Vw of the W-phase immediately after the switching becomes a voltage of the non-energized phase at the angle of 90 degrees. Based on this voltage Vw, it is possible to set the voltage threshold to be used for detecting the angle of 90 degrees, that is, the timing of switching from the energization pattern (4) to the energization pattern (5).

Controller 213 continues the energization in one energization pattern for the predetermined time (2), and then switches the energization pattern to the next pattern. The voltage of the non-energized phase appearing when the predetermined time (1) elapses after the switching is measured as the voltage of the non-energized phase at the switching timing of the energization patterns, and controller 213 repeats such measurement, and thereby learns the voltage thresholds corresponding to the respective energization patterns.

Controller 213 may use the pulse induced voltage sampled in step S307 as the voltage threshold as it is, and further may calculate the voltage threshold using the pulse induced voltage sampled in step S307 as a variable.

Controller 213 determines in step S308 whether the voltage thresholds in all the energization patterns are learned or not. When the voltage thresholds in all the energization patterns are not learned, the operation returns to step S301 to continue the learning of the voltage threshold.

When controller 213 learns the voltage thresholds in all the energization patterns, the operation proceeds to step S309, in which controller 213 determines the completion of the learning.

The method of measuring the pulse induced voltage according to the timing of switching of the energization patterns is not limited to the above, and various known measuring methods may be appropriately employed.

Figure 10:
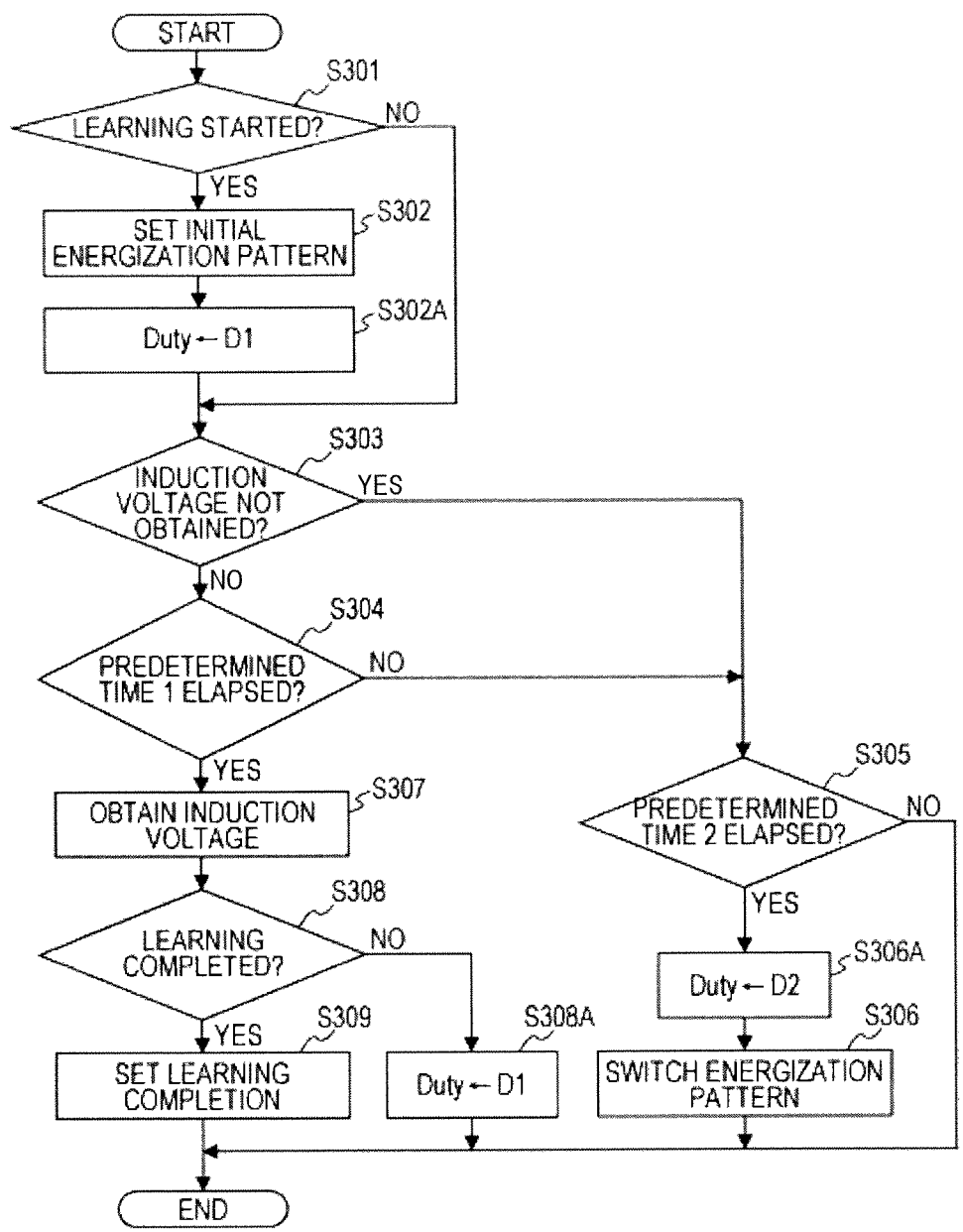
FIG. 10 is a flowchart illustrating processing of measuring the pulse induced voltage at the angle where switching of the energized phases are performed in an embodiment of the invention.

As an example of the learning of the voltage threshold in step S104 of the flowchart of FIG. 6, a flowchart of FIG. 10 illustrates an example of the learning processing which is configured to switch duty cycles in the PWM control of brushless motor 2 corresponding to a case in which the positioning is performed and a case in which the voltage is sampled according to the switching timing of the energization patterns.

In the flowchart of FIG. 10, the steps performing the substantially same processing as those in the flowchart of FIG. 9 bear the same step numbers, and detailed description thereof is omitted.

In the flowchart of FIG. 10, the operation of controller 213 proceeds to step S302A after step S302, in which the initial energization pattern is set, and controller 213 sets the duty cycle in the PWM control of brushless motor 2 to a duty cycle D1 used for positioning brushless motor 2 by rotating brushless motor 2.

When controller 213 determines in step S308 that the learning of all the energization patterns is not completed, the operation proceeds to step S308A, and controller 213 sets the duty cycle in the PWM control of brushless motor 2 to the foregoing duty cycle D1.

Duty cycle D1 set in step S302A may be equal in value to duty cycle D1 set in step S308A, and also may be different therefrom.

When controller 213 determines, in step S305, the elapsing of the predetermined time (2) in the control state with duty cycle D1, controller 213 prepares for the learning of the voltage threshold, and sets in step S306A the duty cycle in the PWM control of brushless motor 2 to a duty cycle D2 smaller than the duty cycle D1.

Controller 213 waits for elapsing of the predetermined time (1) in the control state with the duty cycle D2. When the predetermined time (1) elapses, controller 213 learns the voltage at that time of the non-energized phase as the pulse induced voltage at the switching angle of the energization pattern, and samples the voltage, and then sets the duty cycle back from the duty cycle D2 to the duty cycle D1.

For example, in a case in which the oil drawn by electric oil pump 1 has a high viscosity in a low temperature state, brushless motor 2 cannot be rotated to a predetermined position corresponding to the energization pattern when the duty cycle is low at the time of positioning brushless motor 2, and thereby erroneous learning of the voltage threshold might occur.

Conversely, when the voltage of the non-energized phase at the angle of switching the energization patterns is sampled, the voltage induced in the non-energized phase increases as the duty cycle increases. Therefore, when the voltage threshold is learned based on the pulse induced voltage sampled in the state in which the duty cycle is high, the pulse induced voltage may not reach the voltage threshold in a state in which the duty cycle is low and thus the pulse induced voltage is decreased. Accordingly, it may be impossible to detect the timing of switching of the energization patterns.

Furthermore, when the voltage threshold that can be applied even in the state of the low duty cycle is set based on the voltage that is sampled in the state of the high duty cycle, the learning error of the voltage threshold increases, and accordingly, it may be impossible to switch the energization patterns according to the appropriate timing.

Thus, when controller 213 positions brushless motor 2, that is, when controller 213 rotates brushless motor 2 to the switching angle of the energization pattern, controller 213 sets the duty cycle D1 allowing the rotation of brushless motor 2 even at a low temperature. Also, when the voltage of the non-energized phase is sampled at the switching angle, controller 213 sets the duty cycle D2 (D2<D1) lower than that at the time of positioning, which allows the learning of the voltage threshold with sufficiently high accuracy.

The duty cycle D1 is used for ensuring the motor torque in the low temperature state, and therefore the necessity of employing the duty cycle D1 in the high temperature state is low. Accordingly, controller 213 may set the duty cycle D1 to a greater value as the oil temperature decreases, and may cancel the switching of the duty cycles when the oil temperature exceeds a set temperature.

Figure 11:
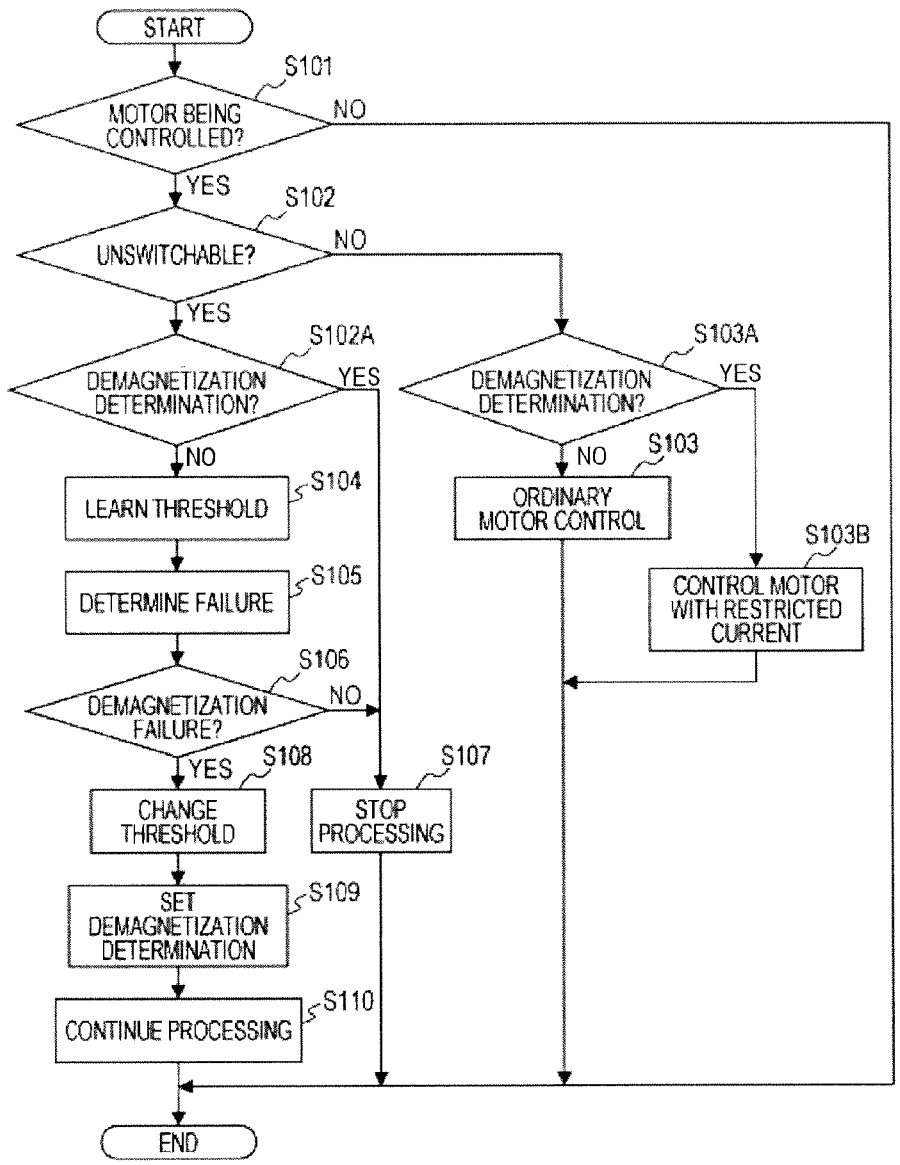
FIG. 11 is a flowchart illustrating processing performed in a case in which the demagnetization failure occurs in the brushless motor of an embodiment of the invention.

A flowchart of FIG. 11 illustrates another example of the control in a case in which the demagnetization failure occurs.

In the control of the flowchart of the FIG. 11, a step of executing the processing for suppressing further demagnetization in a case in which the demagnetization failure has occurred, is added to the control of the flowchart of FIG. 6.

Therefore, steps performing the substantially same processing as those in the flowchart of FIG. 6 bear the same step numbers, and detailed description thereof is omitted.

In the flowchart of FIG. 11, when controller 213 determines in step S102 that a state in which the pulse induced voltage of the non-energized phase has not reached the threshold set for each energization pattern has continued for a set time or more, the operation proceeds to step S102A, in which controller 213 determines whether a history of detecting the demagnetization failure is present or not.

When the history of detecting the demagnetization failure is present, that is, when the demagnetization failure was detected and thus the voltage threshold was changed to perform the control, it can be estimated, even when the voltage threshold was changed based on the detection of the demagnetization failure, that the pulse induced voltage has not reached the changed voltage threshold due to, e.g., further progression of the demagnetization. Accordingly, the operation of controller 213 proceeds to step S107 without learning the voltage threshold, and controller 213 stops the energization of brushless motor 2 to stop the rotation of brushless motor 2.

When the history of detection of the demagnetization failure is present, controller 213 may learn the voltage threshold again. When the learned voltage threshold is small and deviates from an allowed range, controller 213 may determine that the demagnetization failure has advanced beyond the allowed range, and may stop the energization control of brushless motor 2.

Furthermore, when controller 213 determines in step S102 that the switching of the energization patterns was performed, based on the comparison between the pulse induced voltage of the non-energized phase and the voltage threshold, the operation proceeds to step S103A, in which controller 213 determines whether the history of detecting the demagnetization failure is present or not.

When controller 213 determines in step S103A that the history of detecting the demagnetization failure is present, that is, when controller 213 continues the control of brushless motor 2 after changing the voltage threshold according to the decrease in the pulse induced voltage due to the demagnetization failure, the operation of controller 213 proceeds to step S103B.

In step S103B, controller 213 restricts the motor current of brushless motor 2 to be less than that in a case in which the demagnetization failure has not occurred, and continues the control of brushless motor 2.

Thus, when the demagnetization failure occurs, controller 213 sets the allowed motor current that is less than a motor current allowed when the demagnetization failure has not occurred, and controls the motor current not to exceed this allowed motor current.

When the history of detecting the demagnetization failure is not present, i.e., when the demagnetization failure has not occurred, the operation of controller 213 proceeds to step S103, in which controller 213 controls brushless motor 2 without performing the processing of suppressing the motor current to be less than the standard.

By suppressing the increase in the motor current when the demagnetization failure has occurred, heat generation of each phase of brushless motor 2 can be suppressed, to suppress progression of the demagnetization.

Controller 213 can estimate that the demagnetization has advanced as the pulse induced voltage decreases, and controller 213 can change and lower the allowed motor current as the demagnetization advances to a further extent.

The entire contents of Japanese Patent Application No. 2013-021212, filed on Feb. 6, 2013, on which priority is claimed, are incorporated herein by reference.

While only select embodiments have been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and it is not for the purpose of limiting the invention, the invention as claimed in the appended claims and their equivalents.

What is claimed is:

1. A drive device for a brushless motor comprising:
   a control unit that switches two phases according to a pulse induced voltage induced in a non-energized phase, the two phases being selected from three phases of the brushless motor and to be applied with a pulse voltage according to a pulse width modulation signal;
   a detecting unit that detects whether an abnormality occurs or not in control executed by the control unit; and
   a selecting unit that selects between continuation and stop of the control executed by the control unit according to the pulse induced voltage at an angle of switching the two phases to be applied with the pulse voltage, when the abnormality occurs in the control executed by the control unit,
   wherein the control unit detects a timing of switching the two phases to be applied with the pulse voltage by comparing the pulse induced voltage induced in the non-energized phase with a threshold,
   wherein the selecting unit changes the threshold when the control executed by the control unit is to be continued, and wherein the selecting unit changes the threshold to a voltage closer to a voltage of a neutral point.

2. The drive device for the brushless motor according to claim 1, wherein
the selecting unit continues the control executed by the control unit when the pulse induced voltage at the angle of switching the two phases to be applied with the pulse voltage satisfies a predetermined condition, and stops the control executed by the control unit when the pulse induced voltage at the angle of switching the two phases to be applied with the pulse voltage does not satisfy the predetermined condition.

3. The drive device for the brushless motor according to claim 1, wherein
the selecting unit continues the control executed by the control unit when the pulse induced voltage at the angle of switching the two phases to be applied with the pulse voltage falls within a predetermined range corresponding to each of the angles of the switching, and stops the control executed by the control unit when the pulse induced voltage at the angle of switching the two phases to be applied with the pulse voltage does not fall within the predetermined range.

4. The drive device for the brushless motor according to claim 1, wherein
the detecting unit detects occurrence of the abnormality in the control executed by the control unit when the pulse induced voltage does not reach the threshold.

5. The drive device for the brushless motor according to claim 1, wherein
the selecting unit restricts a motor current to be lower than that flowing before occurrence of the abnormality when the control executed by the control unit is to be continued.

6. The drive device for the brushless motor according to claim 1, wherein
when the abnormality occurs in the control executed by the control unit, the selecting unit successively drives the brushless motor to the angles of switching the two phases to be applied with the pulse voltage, and measures the pulse induced voltage of the non-energized phase at each angle of switching.

7. The drive device for the brushless motor according to claim 6, wherein
the selecting unit sets a duty cycle used in a case of measuring the pulse induced voltage at the angle of switching to be lower than a duty cycle used in a case of driving the brushless motor toward the angle of switching.

8. The drive device for the brushless motor according to claim 1, wherein
the selecting unit selects between continuation and stop of the control executed by the control unit based on whether the pulse induced voltage at each of the angles of switching the two phases to be applied with the pulse voltage is lower than the voltage at the neutral point or not.

9. A drive device for a brushless motor comprising:
control means that switches two phases according to a pulse induced voltage induced in a non-energized phase, the two phases being selected from three phases of the brushless motor and to be applied with a pulse voltage according to a pulse width modulation signal;
detecting means that detects whether an abnormality occurs or not in control executed by the control means; and
selecting means that selects between continuation and stop of the control executed by the control means according to the pulse induced voltage at an angle of the switching of the two phases to be applied with the pulse voltage, when the abnormality occurs in the control executed by the control means,
wherein the control means detects a timing of switching the two phases to be applied with the pulse voltage by comparing the pulse induced voltage induced in the non-energized phase with a threshold,
wherein the selecting means changes the threshold when the control executed by the control means is to be continued, and
wherein the selecting means changes the threshold to a voltage closer to a voltage of a neutral point.

10. A drive method for a brushless motor comprising the steps of:
switching two phases according to a pulse induced voltage induced in a non-energized phase, the two phases being selected from three phases of the brushless motor and to be applied with a pulse voltage according to a pulse width modulation signal;
detecting whether an abnormality occurs or not in switching control of the two phases to be applied with the pulse voltage;
measuring the pulse induced voltage at an angle of switching the two phases to be applied with the pulse voltage, when the abnormality occurs in the switching control; and
selecting between continuation and stop of the control of the brushless motor according to the measured pulse induced voltage,
wherein the step of switching the two phases to be applied with the pulse voltage comprises the step of detecting a timing of switching the two phases to be applied with the pulse voltage by comparing the pulse induced voltage induced in the non-energized phase with a threshold,
wherein the step of selecting between the continuation and the stop of the control of the brushless motor comprises the step of changing the threshold when the control of the brushless motor is to be continued, and
wherein the step of changing the threshold comprises the step of changing the threshold to a voltage closer to a voltage of a neutral point.

11. The drive method for the brushless motor according to claim 10, wherein the step of selecting between the continuation and the stop of the control of the brushless motor comprises the steps of:
continuing the control of the brushless motor when the pulse induced voltage at the angle of switching the two phases to be applied with the pulse voltage satisfies a predetermined condition; and
stopping the control of the brushless motor when the pulse induced voltage at the angle of switching the two phases to be applied with the pulse voltage does not satisfy the predetermined condition.

12. The drive method for the brushless motor according to claim 10, wherein the step of selecting between the continuation and the stop of the control of the brushless motor comprises the steps of:
continuing the control of the brushless motor when the pulse induced voltage at the angle of switching the two phases to be applied with the pulse voltage falls within a predetermined range corresponding to each of the angles of the switching; and
stopping the control of the brushless motor when the pulse induced voltage at the angle of switching the two phases to be applied with the pulse voltage does not fall within the predetermined range.

13. The drive method for the brushless motor according to claim 10, wherein
the step of detecting whether the abnormality occurs or not in the switching control comprises the step of:
detecting occurrence of the abnormality in the switching control when the pulse induced voltage does not reach the threshold.

14. The drive method for the brushless motor according to claim 10, wherein the step of selecting between the continuation and the stop of the control of the brushless motor comprises the step of:
restricting a motor current to be lower than that flowing before occurrence of the abnormality when the control of the brushless motor is to be continued.

15. The drive method for the brushless motor according to claim 10, wherein the step of measuring the pulse induced voltage comprises the step of:
setting a duty cycle used in a case of measuring the pulse induced voltage at the angle of switching to be lower than a duty cycle used in a case of driving the brushless motor toward the angle of switching.

16. The drive method for the brushless motor according to claim 10, wherein the step of selecting between the continuation and stop of the control of the brushless motor comprises the steps of:
comparing the pulse induced voltage at each of the angles of switching the two phases to be applied with the pulse voltage with the neutral point; and
selecting between the continuation and the stop of the control of the brushless motor based on a result of the comparison.

\* \* \* \* \*